US012572458B2

(12) United States Patent
Basu et al.

(10) Patent No.: US 12,572,458 B2
(45) Date of Patent: Mar. 10, 2026

(54) MEMORY MANAGEMENT IN CONTAINERS INITIATED WITH CONTIGUOUS MEMORY OF FIXED SIZE

(71) Applicant: Oracle International Corporation, Redwood Shores, CA (US)

(72) Inventors: Pramit Basu, Bengaluru (IN); Satyanarayana Suryanarayana Chitturi, Bengaluru (IN)

(73) Assignee: Oracle International Corporation, Redwood Shores, CA (US)

( * ) Notice: Subject to any disclaimer, the term of this patent is extended or adjusted under 35 U.S.C. 154(b) by 122 days.

(21) Appl. No.: 18/591,031

(22) Filed: Feb. 29, 2024

(65) Prior Publication Data

US 2025/0278356 A1 Sep. 4, 2025

(51) Int. Cl.
*G06F 12/02* (2006.01)
*G06F 9/455* (2018.01)

(52) U.S. Cl.
CPC ........ *G06F 12/023* (2013.01); *G06F 9/45558* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 2014/0013059 A1* | 1/2014 | Joshi | G06F 9/5077 |
| | | | 711/144 |
| 2014/0068600 A1* | 3/2014 | Ashok | G06F 9/5077 |
| | | | 718/1 |
| 2024/0176670 A1* | 5/2024 | Nanjundappa | G06F 9/5044 |

OTHER PUBLICATIONS

Hazelcast lets you build real-time apps that react instantly, https://hazelcast.com/, downloaded circa 2025, 06 pages.

* cited by examiner

*Primary Examiner* — Baboucarr Faal
(74) *Attorney, Agent, or Firm* — IPHORIZONS PLLC; Narendra Reddy Thappeta

(57) ABSTRACT

An aspect of the present disclosure is directed to memory management in a digital processing system. A first instance of a container (e.g., Java Virtual Machine (JVM)) is initiated with a first contiguous memory of a first fixed size. A set of applications is executed within the first instance. Upon receiving from an application, a request for an additional amount of memory, the system determines whether the additional amount can be allocated within the first contiguous memory. If the additional amount can be allocated, a first memory space of the additional amount is allocated to the application within the first contiguous memory. If the additional amount cannot be allocated, a second instance of the container is initiated with a second contiguous memory of a second fixed size and a second memory space of additional amount is allocated to the application within the second contiguous memory.

20 Claims, 10 Drawing Sheets

FIG. 3A

MEMORY MANAGEMENT IN CONTAINERS INITIATED WITH CONTIGUOUS MEMORY OF FIXED SIZE

BACKGROUND OF THE DISCLOSURE

Technical Field

The present disclosure relates to computing systems and more specifically to memory management in containers initiated with contiguous memory of fixed size.

Related Art

Containers are used to run applications in computing environments, as is well known in the relevant arts. A container is designed to ensure that only a desired set of services and resources are made available to such running applications. Virtual machines (VMs) are examples of containers, as is also well known in the relevant arts.

Containers share the memory provided in the computing environments, with the sharing of the memory among containers being managed by the operating systems hosting the containers. Some containers are designed to operate only with, and accordingly initiated with, a contiguous memory of a fixed size. In other words, the memory locations constituting such contiguous memory have a single sequence of memory addresses. Java Virtual Machine (JVM) is an example of a container requiring such a contiguous memory of a fixed size.

Challenges are encountered in a container when the applications running in the container together require more aggregate memory than the fixed size, for example, to process more data. Failure to manage such enhanced memory requirements may result in crashing (making inoperative) of the container. Aspects of the present disclosure are accordingly directed to memory management techniques at least in such situations.

BRIEF DESCRIPTION OF THE DRAWINGS

Example embodiments of the present disclosure will be described with reference to the accompanying drawings briefly described below.

FIGS. 3A-3C are block diagrams illustrating the memory map of a server system at different time instances in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 1:
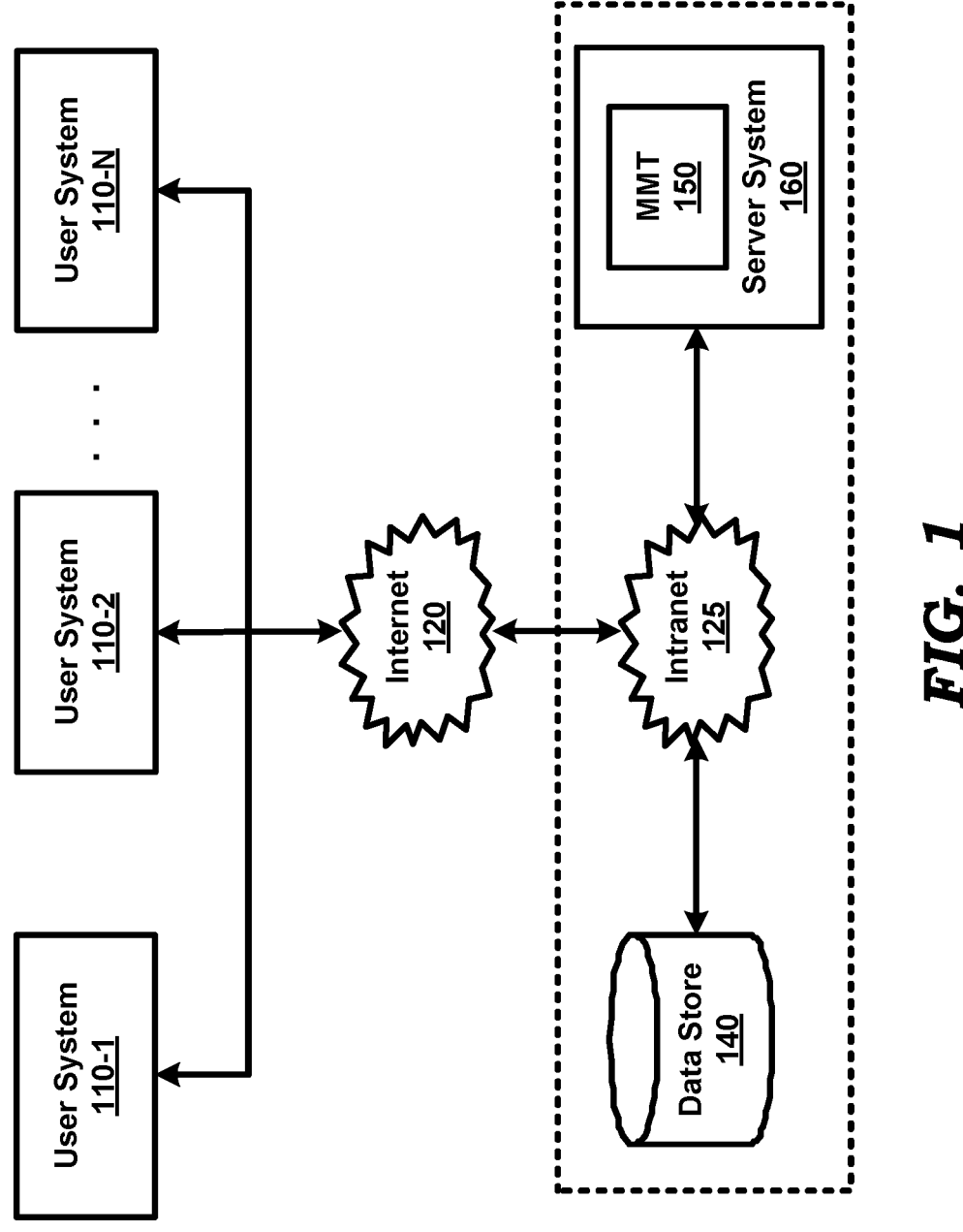
FIG. 1 is a block diagram illustrating an example computing environment in which several aspects of the present disclosure can be implemented.

An aspect of the present disclosure is directed to memory management in a digital processing system. A first instance of a container is initiated with a first contiguous memory of a first fixed size. A set of applications is executed within the first instance of the container. Upon receiving from an application of the set of applications, a request for an additional amount of memory, the system determines whether the additional amount of memory can be allocated to the application within the first contiguous memory of the first fixed size. If the additional amount of memory can be allocated, a first memory space of the additional amount is allocated to the application within the first contiguous memory of the first fixed size. If the additional amount of memory cannot be allocated, a second instance of the container is initiated with a second contiguous memory of a second fixed size and a second memory space of additional amount is allocated to the application within the second contiguous memory. In one embodiment, the container is a Java Virtual Machine (JVM).

According to another aspect of the present disclosure, the first instance of the container contains a memory manager for allocating memory spaces within the first contiguous memory for storing objects of the set of applications. A first set of objects of the application (noted above) is stored in the first memory space, and a second set of objects of the application is stored in the second memory space. The memory manager is designed to provide a common interface to the application for accessing both of the first set of objects and the second set of objects.

According to one more aspect of the present disclosure, the system identifies that all objects of the set of applications require memory space less than a minimum threshold. In response to the identifying, the second set of objects stored in the second contiguous memory is migrated to the first contiguous memory and the second instance of the container is deleted to free the second contiguous memory of the second fixed size.

According to yet another aspect of the present disclosure, the application (noted above) is designed to receive and process user requests received from user systems. The application sends the request for the additional amount of memory to store data received as part of the user requests, with the data being more than the first fixed size representing a runtime memory spike. The initiating and the allocating the second memory space ensures that the first instance of the container is enabled to handle the request. As such, the digital processing system is facilitated to manage the runtime memory spike in the first instance of the container initiated with contiguous memory of the first fixed size.

According to an aspect of the present disclosure, the data (received as part of the user requests) is stored in a map structure as a set of keys and corresponding objects associated with each key, the set of keys containing a first subset of keys and a second subset of keys. A first set of objects associated with the first set of keys are stored in the first instance of the container, while a second set of objects associated with the second set of keys are stored in the second instance of the container. In one embodiment, the map structure is an ElasticMap object implemented as an extension of a HashMap object.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating an example computing environment (computing system) in which several aspects of the present disclosure can be implemented. The block diagram is shown containing user systems 110-1 through 110-N (N representing any natural number), Internet 120, intranet 125, data store 140 and server system 160 (in turn shown containing memory management tool (MMT) 150). User systems 110-1 to 110-N are collectively or individually referred by referral numeral 110, as will be clear from the context.

Merely for illustration, only representative number/type of systems are shown in FIG. 1. Many environments often contain many more systems, both in number and type, depending on the purpose for which the environment is designed. Specifically, many instances of server system 160 and data store 140 may be present in the computing system. Each block of FIG. 1 is described below in further detail.

Intranet 125 represents a data network providing connectivity between data store 140 and server system 160. Internet 120 extends the connectivity of these systems with external systems such as user systems 110. Internet 120 may encompass the world-wide connected Internet. Each of Internet 120 and intranet 125 may be implemented using any combination of wire-based or wireless mediums. Each of Internet 120 and intranet 125 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by Internet 120 and intranet 125. When the packet contains content such as port numbers, which specifies an internal component such as target application and/or internal system, the packet may be directed to such application or internal system as well.

Each of user systems 110 represents a system such as a personal computer, workstation, mobile device, computing tablet etc., used by users to generate (user) requests directed to (software) applications executing in server system 160. A user request refers to a specific technical request (for example, Universal Resource Locator (URL) call) sent to server system 160 from an external system (here, user system) over Internet 120, typically in response to a user interaction at user systems 110. The user requests may be generated by users using appropriate user interfaces (e.g., web pages provided by an application executing in a node, a native user interface provided by a portion of an application downloaded from a node, etc.).

In general, a user system requests an application/data service for performing desired tasks and receives the corresponding responses (e.g., web pages) containing the results of performance of the requested tasks. The web pages/responses may then be presented to a user by a client application such as the browser. Each user request is sent in the form of an IP packet directed to the desired system or application/data service, with the IP packet including data identifying the desired tasks in the payload portion.

Data store 140 represents a non-volatile (persistent) storage facilitating storage and retrieval of data by applications executing in server system 160. Data store 140 may be implemented as a corresponding database server using relational database technologies and accordingly provide storage and retrieval of data using structured queries such as SQL (Structured Query Language). Alternatively, data store 140 may be implemented as a corresponding file server providing storage and retrieval of data in the form of files organized as one or more directories, as is well known in the relevant arts.

Server system 160 represents a server, such as a web/application server, constituted of appropriate hardware, executing applications capable of performing one or more tasks. The tasks may be specified as part of user requests received from user systems 110. Server system 160, in general, receives a user request and performs the tasks requested in the user request. A server system may use data stored internally (for example, in a non-volatile storage/hard disk within the server system), external data (e.g., maintained in data store 140) and/or data received from external sources (e.g., received from a user) in performing the requested tasks. The server system then sends the result of performance of the tasks to the requesting user system (one of 110) as a corresponding response to the user request. The results may be accompanied by specific user interfaces (e.g., web pages) for displaying the results to a requesting user.

In one embodiment, server system 160 also executes on ore more containers, each container in turn executing one or more applications. Examples of containers are Docker®, Google Kubernetes, Java Virtual Machine (JVM), etc. As is well known, some of the containers such as JVM are designed to operate only with, and accordingly initiated with, a contiguous memory space (having single sequence of memory addresses) of a fixed size. The description is continued with respect to JVM, though aspects of the present disclosure are applicable for any other container that is initiated with a contiguous memory of fixed size, as will be apparent to one skilled in the arts by reading the disclosure herein.

Specifically, JVM requires a contiguous block of host memory (that of server system 160) for it to store objects and references. Based on the length of the address of the memory location, when server system 160 is a 32-bit machine, Java can utilize up to $2\char`^32$ address locations, where as in a 64-bit machine, the available memory can go up to more than 18 quintillion bytes, i.e. $2\char`^64$. However, such maximum values are not achievable due to multitude of reasons ranging from underlying operating system (OS) or hardware limitations, inherent increase in size of object pointers in 64-bit JVM, increased object header size and difficulty in assessing the heap that needs to allocated for JVM.

As is well known, the memory "heap" refers to the free memory available in the JVM (that is the contiguous block) in which any memory requested by applications (e.g., Java applications) executing in the JVM is allocated. The amount of heap size that is allocated from the RAM (Random Access Memory) of server system 160 is typically ranged between the Xms (minimum size) and Xmx (maximum size) values provided at startup/initiation time of the JVM. These values need to be considered meticulously as both low and high numbers for these values can either lead to OutofMemory error being thrown by the JVM (when the values are low) or memory starvation for other applications or processes executing in server system 160 (when the values are high), as will be apparent to one skilled in the relevant arts.

It may be appreciated that applications executing in the JVM may request a large amount of memory, that may not be available in the heap, but is available in the main RAM of server system 160. For example, an application executing in the JVM may be designed to receive and process user requests received from user systems 110, and may accordingly request memory to store data received as part of the user requests. When such requests are for enhanced memory requirements, they are referred to as runtime memory spikes.

Prior approaches required the JVM to be restarted so that the Xms and Xmx can be reconfigured. It may be appreciated that any kind of down time to applications and/or server system 160 is expensive and not desirable, especially to handle infrequent and occasional spikes of memory requirements. In addition, it is not practical always to configure everything beforehand in the most optimal way.

Memory Management Tool (MMT) 150, provided according to several aspects of the present disclosure, facilitates memory management in containers initiated with contiguous memory of fixed size (e.g., JVM) while overcoming some of the drawbacks noted above. The manner in which MMT 150 facilitates such memory management is described below with examples.

Figure 2:
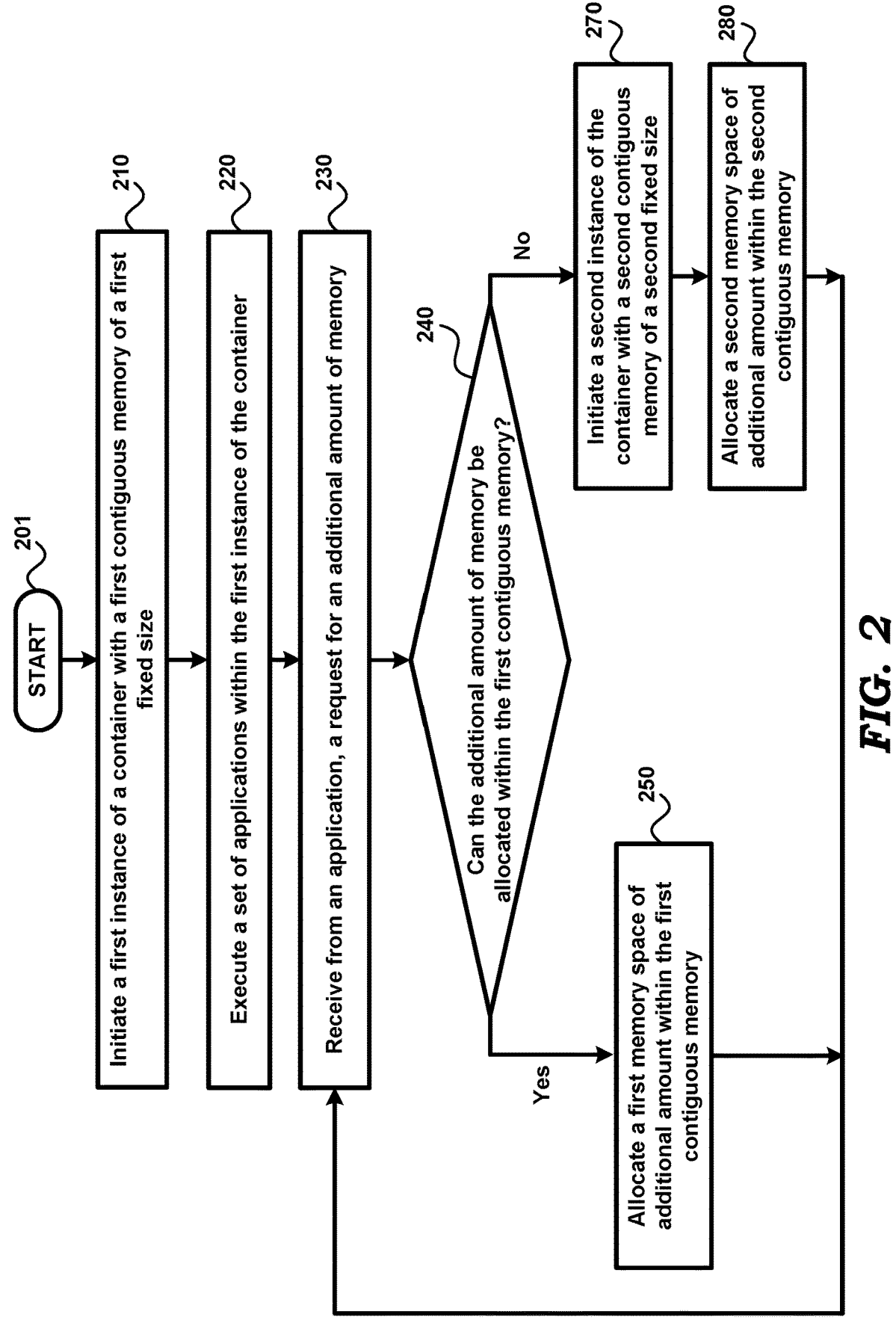
FIG. 2 is a flow chart illustrating the manner in which memory management in containers initiated with contiguous memory of fixed size is provided according to aspects of the present disclosure.

3. Memory Management in Containers Initiated with Contiguous Memory of Fixed Size FIG. 2 is a flow chart illustrating the manner in which memory management in containers initiated with contiguous memory of fixed size is provided according to aspects of the present disclosure. The flowchart is described with respect to the systems of FIG. 1 in particular MMT 150, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 210.

In step 210, a first instance of a container is initiated with a first contiguous memory of a first fixed size. The initiation may be performing by an operating system executing in server system 160. Such initiation may entail allocating the first contiguous memory of the fixed system within a RAM of server system 160, loading the software instructions forming the container within the first contiguous memory, and then executing some of the loaded software instructions to enable to the container to provide a desired set of services and resources.

Each such loading and executing software instructions forming the container in the RAM is referred to an instance of the container. In the following disclosure, the usage of first instance, second instance, etc. implies that such loading and executing has been performed within respective different memory spaces/contiguous memories.

In step 220, a set of applications is executed within the first instance of the container. Such execution of the applications may be performed by the operating system, with such execution entailing loading software instructions forming each application within the first contiguous memory and thereafter executing some of the software instructions within the context of the set of services and resources provided by the container, as is well known in the arts.

It may be noted that the free memory space in the first contiguous memory, excluding the memory spaces used by the container and the applications constitutes the "heap" in which additional memory can be allocated to executing applications, as described below.

In step 230, a request for an additional amount of memory is received from an application executing in the context of the first instance of the container. The term "additional" indicates that the request is for memory in addition to any memory space previously allocated to the application. Such memory allocation performed during run time of applications is known as dynamic memory allocation, as is well known in the relevant arts. Upon allocation, the requesting application would have exclusive access to the allocated memory space.

Such a memory request is typically received by a (container) memory manager contained in the first instance of the container. As is well known, the memory manager is a part of the software instructions forming the container, and is designed to allocate memory spaces within the first contiguous memory for storing objects of the set of applications.

In step 240, the memory manager checks whether the requested additional amount of memory can be allocated within the first contiguous memory. If the requested additional amount of memory can be allocated, control passes to step 250 and to step 270 otherwise.

In step 250, the memory manager allocates a first memory space of additional amount within the first contiguous memory. The allocated first memory space may thereafter be provided (for example, by sending the start memory address) to the requesting application, thereby enabling the requesting application to access the first memory space (e.g., to store desired data/objects). Control then passes to step 230 for processing subsequent requests for additional memory.

In step 270, upon determining that the requested additional amount of memory cannot be allocated in the first contiguous memory, MMT 150 initiates a second instance of the container with a second contiguous memory of a second fixed size (which may be the same or different from the first fixed size noted above). It should be noted that the second contiguous memory allocated in the (same) RAM of server system 160 is different from that of the first contiguous memory allocated to the first instance.

In step 280, MMT 150 allocates a second memory space of additional amount within the second contiguous memory. It may be noted that the second memory space can be the whole of the additional amount requested or only a part of the additional requested (with the rest being allocated in the first contiguous memory).

It may be appreciated that the allocated second memory space may not be directly provided to the requesting application. According to an aspect, the memory manager is designed to provide a common interface for accessing data/objects stored in both the first memory space and the second memory space. Common interface implies that the manner in which the application requests/receives access to the objects in both the first and second memory spaces is the same (in terms of data format, parameter specified, etc.). Control then passes to step 230 for processing subsequent requests for additional memory.

Thus, MMT 150 provides memory management in containers initiated with contiguous memory of fixed size (e.g., JVM). Such a technique eliminates the need to restart the container/JVM to re-configure the memory settings for handling infrequent and occasional spikes of memory. Such a technique also can stretch to accommodate additional memory needs for some time without the need to re-configure the container/JVM. It may be noted that the technique is not a load balancing solution but a mitigation for sudden spikes in memory requirements. The manner in which MMT 150 provides several aspects of the present disclosure according to the steps of FIG. 2 is described below with examples.

4. Illustrative Example

FIGS. 3A-3C, 4 and 5A-5C together illustrate the manner in which memory management in containers initiated with contiguous memory of fixed size is provided in one embodiment. Each of the Figures is described in detail below.

Figure 3A:
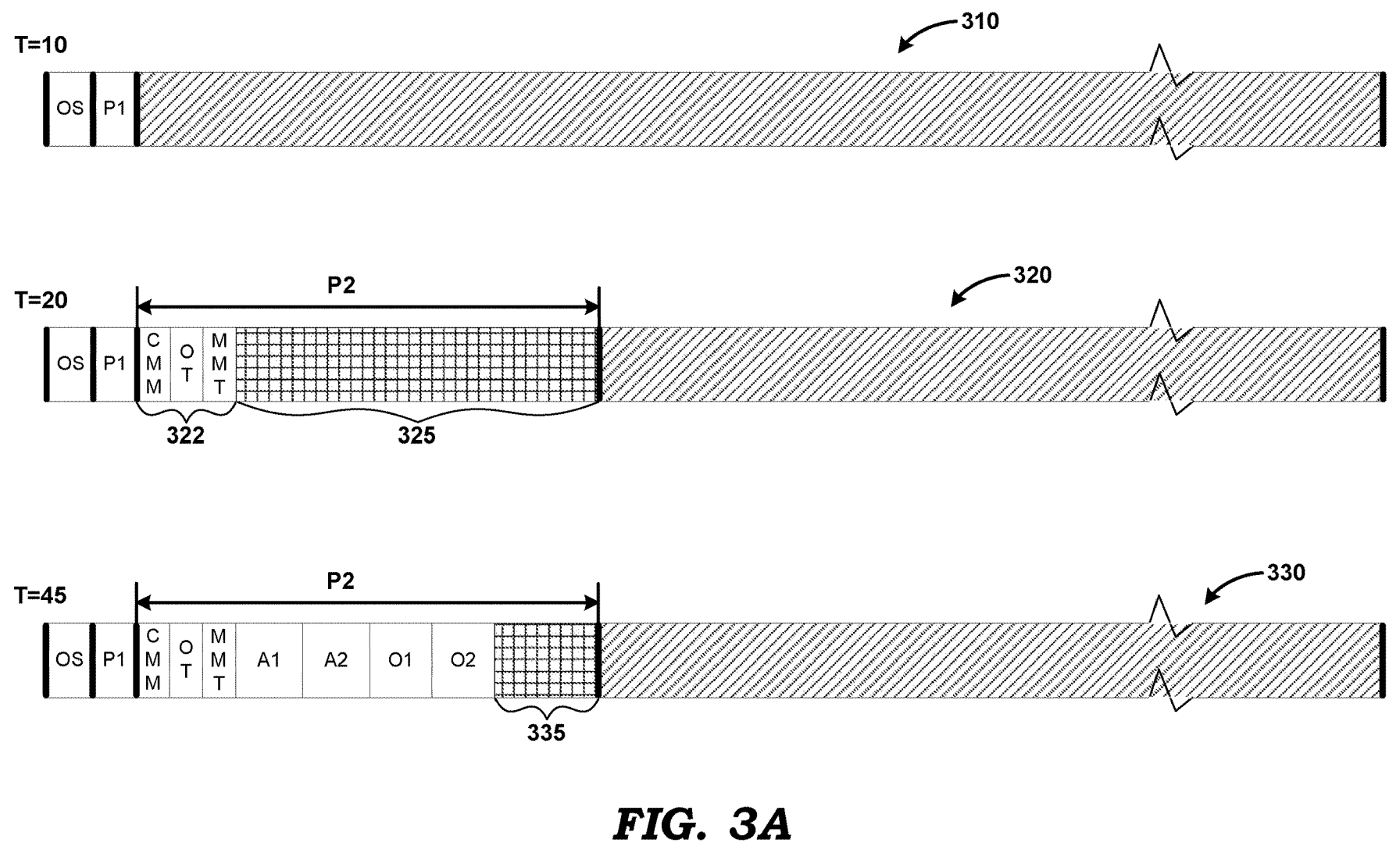
Figure 3B:
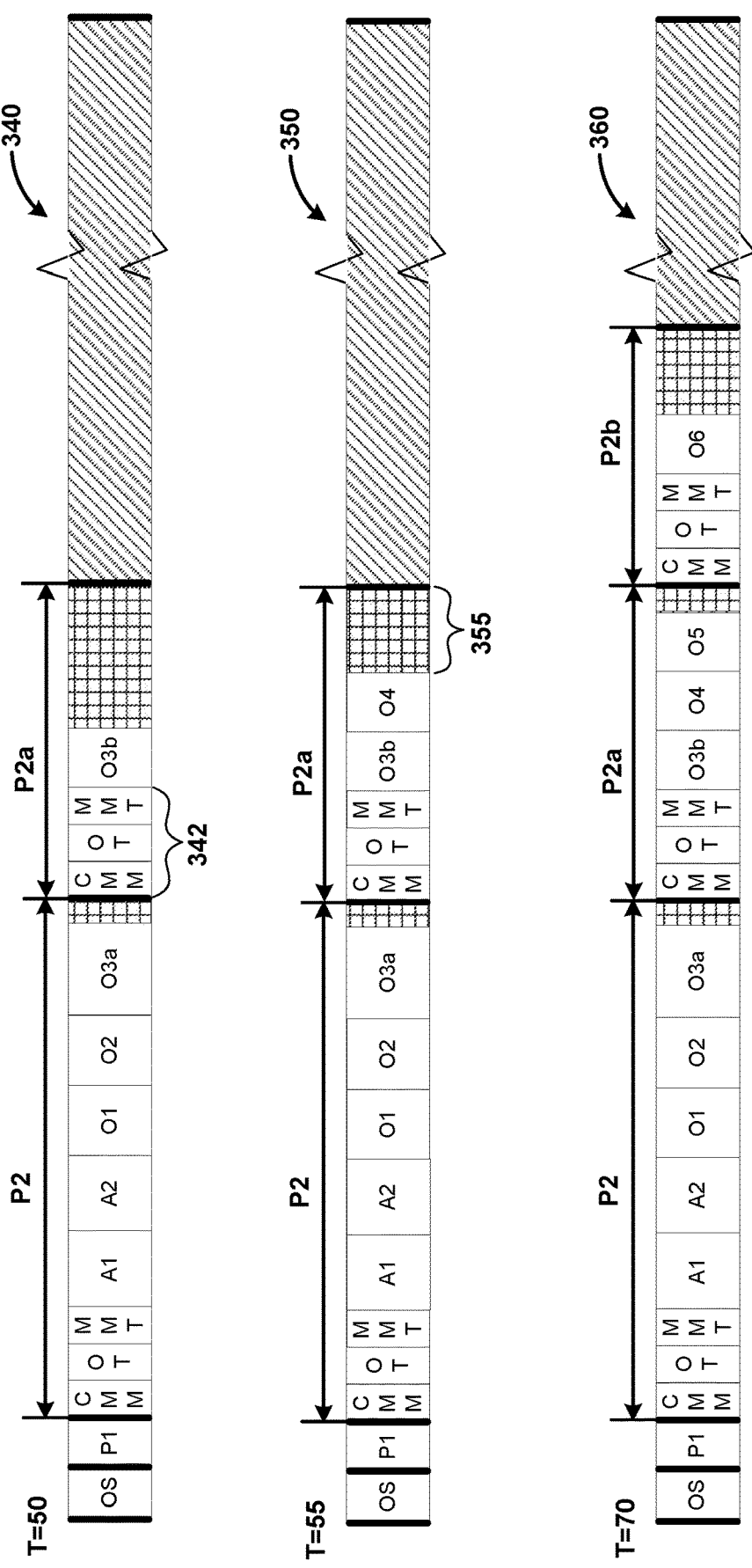
Figure 3C:
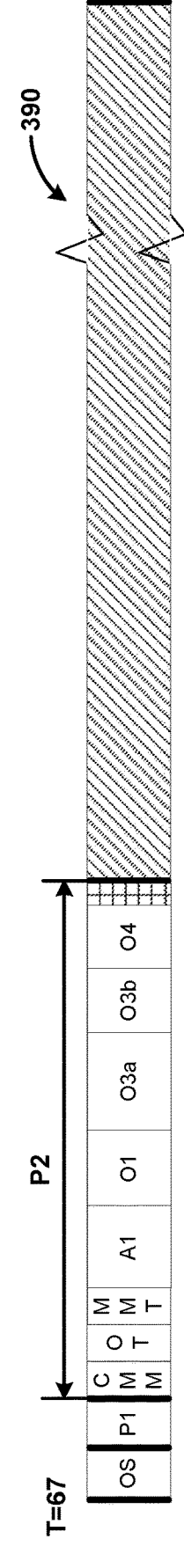

FIGS. 3A-3C are block diagrams illustrating the memory map of a server system (160) at different time instances in one embodiment. The memory maps are shown for a main memory (e.g., RAM) contained in server system 160. In the following disclosure, the time instances are assumed to be milliseconds (ms), though in alternative embodiments, the time instances may represent any convenient unit of time. Each of the memory maps is described in detail below.

Referring to FIG. 3A, memory map 310 at T=10 ms depicts a state of the main memory in which an operating system (OS) and a process (P1) are executing in the main memory. The portion(s) marked with a diagonal stripe/slash pattern indicates the free memory in which the operating system can allocate memory spaces for additional processes or data (based on memory allocation requests received from the applications executing in the main memory).

Memory map 320 at T=20 ms depicts the state of the main memory in response to initiating an instance of a container (e.g., JVM) with a contiguous memory of a fixed size. Process P2 represents the container, and accordingly referred to as container P2 in the following disclosure. It may be observed that the memory space for container P2 is contiguous, and is less than the maximum size of the main memory. Container P2 in turn is shown as having software instructions loaded in memory (322) which form a container memory manager (CMM), an object table (OT) and an instance of memory management tool (MMT 150).

CMM is responsible for (dynamic) allocation of memory within the heap of the container. In one embodiment, the requests for dynamic allocation are for allocating corresponding objects. Upon receiving a memory allocation request, CMM allocates the memory space required for the object specified in the request, stores the object in the allocated memory space, add the location of the object in the OT and then returns an object identifier (pointer to object) as a response to the request. Upon the application desiring to access the object, CMM performs the translation of the object identifier to the corresponding memory location. Such an architecture enables the CMM to perform various memory optimizations such as garbage collection, defragmentation, etc., as is well known in the arts.

Thus, OT stores a map of object identifiers to corresponding memory locations where the objects are stored in memory. MMT (150) represents an instance of the memory management tool provided according to several aspects of the present disclosure. Though MMT is shown being loaded at the time of initiation of the container, in alternative embodiments, the MMT may be loaded dynamically, for example, when CMM is unable to allocate the memory space required for a requested object within the heap of container P2. The portion(s) marked with a grid pattern indicates the heap (325) in which the container can allocate memory spaces for applications and or objects within the contiguous memory allocated to container P2.

Memory map 330 at T=45 ms depicts the state of the main memory after applications (such as A1 and A2) have been loaded and started execution in container P2. O1 and O2 represent objects that have been dynamically allocated within the heap of container P2. It may be observed that memory 335 represents the heap in which additional applications/objects can be dynamically allocated.

Referring to FIG. 3B, memory map 340 at T=50 ms depicts the state of the main memory in response to receiving a request for allocating a new object (O3) requiring an additional amount of memory. The request is assumed to be received from application A1, for example, in response to receiving (from one of user systems 110) a large amount of data to be processed. CMM determines that the memory required for new object O3 is not available in heap 335 and as such MMT initiates a child instance of the container (e.g., JVM) with a contiguous memory of another fixed size (same or different from the fixed size for that of container P2).

Process P2*a* represents the child container, and accordingly referred to as child container P2*a* in the following disclosure. It should be noted that child container P2*a* is allocated in the free memory of the RAM. Child container P2*a* in turn is shown as having software instructions loaded in memory (342) which form corresponding instances of CMM, OT and MMT for the child container. After initiating child container P2*a*, object O3a is shown allocated in two memory spaces—O3a in parent container P2 and O3b in child container P2*a*. As such, aspects of the present disclosure facilitate handling of runtime memory spikes without requiring a container (P2) to be restarted.

Memory map 350 at T=55 ms depicts the state of the main memory after a child container (P2*a*) has been initiated and has been processing requests for additional amount of memory. It may be observed that additional memory objects such as O4 are shown allocated in the heap of child container P2*a*. It may be observed that memory 355 represents the heap in which additional applications/objects can be dynamically allocated.

Memory map 360 at T=70 ms depicts the state of the main memory after multiple child containers (P2*a* and P2*b*) have been initiated. Child container P2*b* has been initiated similar to child container P2*a* and is shown storing object O6, in response to determining that object O6 cannot be allocated within heap 365 in child container P2*a*.

According to an aspect, MMT 150 identifies that all objects (such as O1, O2, etc.) of the set of applications (A1, A2, etc.) require memory space less than a minimum threshold, for example less than the heap available in the parent container P2. Referring to FIG. 3C, memory map 380 at T=65 ms depicts the state of the main memory when the memory space required for objects in less than a minimum threshold. Memory 382, 385, 387 together represent the heap of parent container P2.

In response to the identifying, MMT 150 migrates the objects stored in the contiguous memory of child container P2*a* to the contiguous memory of the parent container P2, and then deletes the child container P2*a* to free contiguous memory of another fixed size. The term "delete" indicates that the contiguous memory previously occupied by child container P2*a* is made part of free memory in the main memory, thereby allowing the deleted memory to be used for memory allocation of processes and data. Memory map 390 at T=67 ms depicts the state of the main memory after a child container has been deleted. Objects O3b and O4 are shown migrated from child container P2*a* to parent container P2, and child container P2*a* is shown deleted.

In one embodiment, the spawning and reclamation of child container is performed based monitoring the heap size in the parent container and the free memory available in the system at periodical intervals. In the scenario that the heap memory of a container exceeds a pre-configured maximum memory threshold, new child container(s) get spawned as described above. If the heap memory is below a pre-configured minimum memory threshold or a pre-configured duration (e.g., configurable as minReclaimWait), the objects held in the child containers get reclaimed based on a LIFO (last in first out) policy, whereby objects that were last allocated (such as O4) are migrated to the parent container before objects previously allocated (such as O3b). All the above action are transparent to the consuming/requesting applications.

Thus, MMT 150 enhances memory management in containers initiated with contiguous memory of fixed size (e.g., JVM). The manner in which MMT 150 may be implemented is described below with examples.

5. Memory Management Tool

Figure 4:
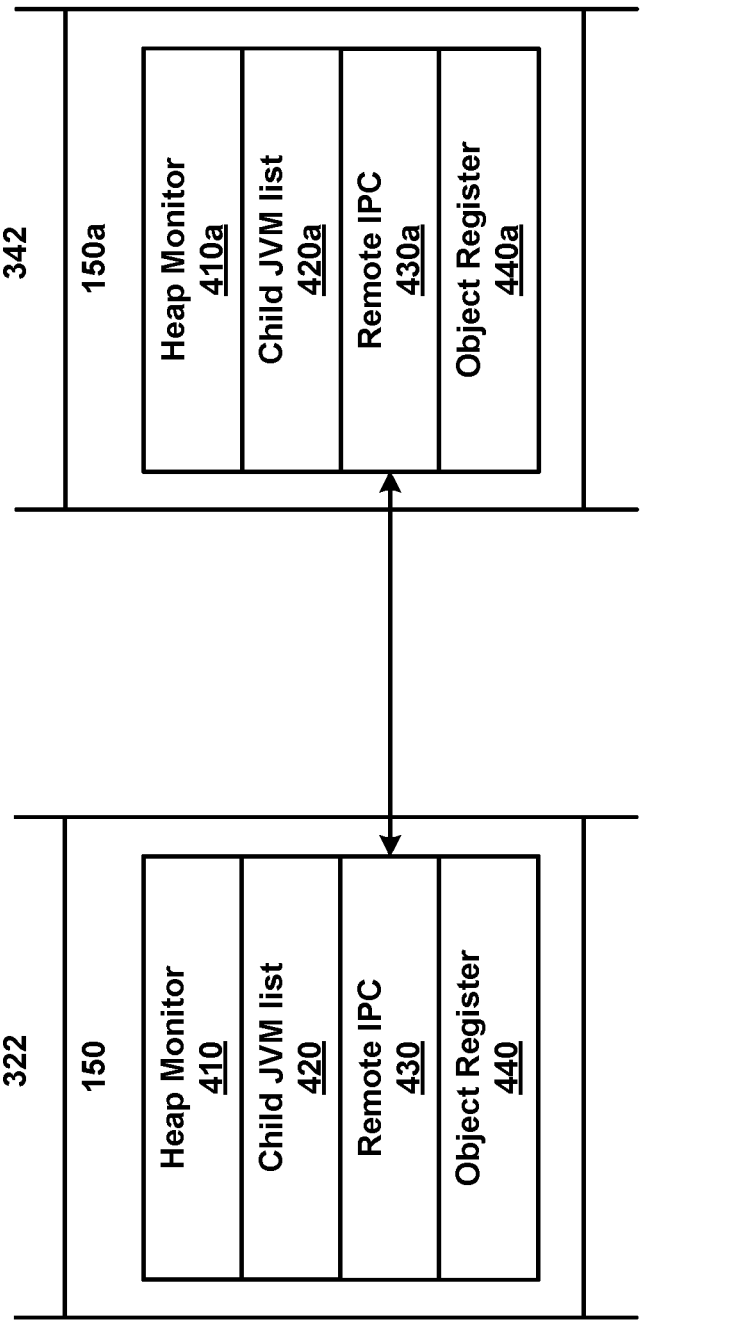
FIG. 4 is a block diagram illustrating the manner in which a memory management tool is implemented in one embodiment.

FIG. 4 is a block diagram illustrating the manner in which a memory management tool (150) is implemented in one embodiment. Typically, multiple instances of MMT 150 execute in corresponding instances of the container in memory. For illustration, only two instance are shown in the Figure-one instance (150) executing in the memory (322) of container P2 and another instance (150*a*) executing in the memory (342) of child container P2*a*. MMT 150 is shown containing heap monitor 410, child container handler 420, remote IPC 430 and object register 440. Corresponding instances (indicated by the suffix "a") are also shown executing in child container P2*a*. Each of the blocks is described in detail below.

Heap monitor 410 tracks the size of the heap in a container (such as P2 noted above). In one embodiment, an underlying system monitoring utility (e.g., available in JVM) reports heap usage of the container and the main memory (RAM) available on the underlying host (server system) every periodic interval. Heap monitor 410 is implemented to receive the above noted data and track the size of the heap.

Specifically, heap monitor 410 performs such tracking to determine whether an additional amount of memory requested as part of a (dynamic) memory allocation request can be allocated within the heap of container P2. Upon determining that the additional amount of memory can be allocated (e.g. for O2), heap monitor 410 does not do any further processing, allowing CMM to handle the memory request/requirement. On the other hand, upon determining that the additional amount of memory cannot be allocated within the heap of container P2 (e.g. for O3), heap monitor 410 triggers child container handler 420.

Child container handler 420 initiates a child instance of the container (e.g. P2*a*) upon receiving the trigger from heap monitor 410. Child container handler 420 may maintain a list of child containers (e.g., P2*a*, P2*b*) created for the parent container. In general, child container handler 420 spawn one or more new instances of a container (e.g., JVMs) and initializes the data structures (object register 440 described below) in the child containers for access.

Child container handler 420 also identifies that all objects of the set of applications executing in the parent container (P2) requires memory space less than a minimum threshold, migrates the objects (e.g., O3a, O4) stored in the child container (P2*a*) to the parent container and then deletes the child container.

Remote IPC (inter process communication) 430 facilitates the multiple instances of the memory management tool to communicate with each other (as indicated by the arrow in the Figure). Specifically, such communication is used to allocate new objects (e.g., O3b, O4, etc.) in the child container, accessing the objects allocated in the child container and migrating objects from the child container to the parent container.

Object register 440 maintains a set of object keys (e.g. identifiers) against the specific containers (e.g., JVMs) that host the objects. Object register 440 operates in addition to the object table noted above. The implementation at its heart uses a register that maintains object keys against VMs that host them. This is modified as and when an object is reclaimed or merged into the parent VM. This keeps track of the VMs that host the objects being queried for In one embodiment, when an object (or part of the object) such as O3b, O4, etc. is allocated in the heap of a child container, child container handler 420 generates a new object key and stores in object register 440, the new object key associated with the child container. The new object key is then stored associated with the object identifier in the OT of the parent container.

Upon the CMM in the parent container receiving a request to access an object (from an application such as A1), if child container handler 420 determines that the requested object is stored in the parent container (P2), no further processing is done, allowing CMM to processes the access request as noted above. Upon determining that the requested object is stored in a child container (e.g., P2*a*), child container handler 420 retrieves the object key stored in the OT, identifies the child container corresponding to the object key using object register 440, communicates (using remote IPC 430) with the identified child container to retrieve the object, and provides the access to the retrieved object to the requesting application (here, A1). It may be appreciated that above noted actions happen in the background without visibility to the requesting application. As such, the container memory manager is facilitated to provide a common interface for accessing objects (whether stored in parent container P2 or a child container P2*a*) to requesting applications.

Thus, aspects of the present disclosure provide for a MMT 150 included in a parent container (e.g. JVM) that addresses the memory requirements of main applications, with the ability to create additional child instances on demand that can host the data/objects that need to be scaled out. Some of the configurations of MMT 150 may be (i) Autoscale max threshold—threshold of available heap on parent container crossing which a new/child container is initiated; (ii) Autoscale min threshold—threshold of available heap on parent container to start reclaiming/migrating objects from child container; (iii) Threshold for number of child containers that can be created; and (iv) Xms and Xmx of child containers.

One advantage of such an approach of scaling objects within containers without allocating too much heap that can result in paging and too little heap that can lead to OutofMemory errors, helps in mitigating the occasional spikes in memory needs. In cloud environments, where containers are co-hosted in the underlying infrastructure and are cost sensitive, such scaling can address the need to mitigate extra cost incurred for infrastructure scaling. It may be noted that such an approach provides for vertical scaling, i.e., within the same host (server system 160), since there are other ways to approach horizontal scaling, for example, via a cluster of hosts, etc. In addition, using an IPC for inter process communication may add a slight overhead to accessing objects within the process/application space.

It may be appreciated that such a dynamic scale out and scale in memory allocation architecture may be particularly desirable when applications handle data structures such as a map structure. As is well known, a map structure stores data as a set of keys and corresponding objects associated with each key. An example of such a map structure is HashMap available as part of Java programming language framework.

According to an aspect, MMT 150 stores a first set of objects associated with a first subset of keys in a first instance of a container (e.g., P2), while storing a second set of objects associated a second subset of keys in a second/child instance of the container (e.g., P2a). As noted above, such storage is transparent to an application handling the map structure. In one embodiment, such a map structure is referred to as an ElasticMap object implemented as an extension of the HashMap object noted above. The manner in which such an elastic map structure may be implemented is described below with examples.

6. Implementing Elastic Map Structure

Figure 5A:
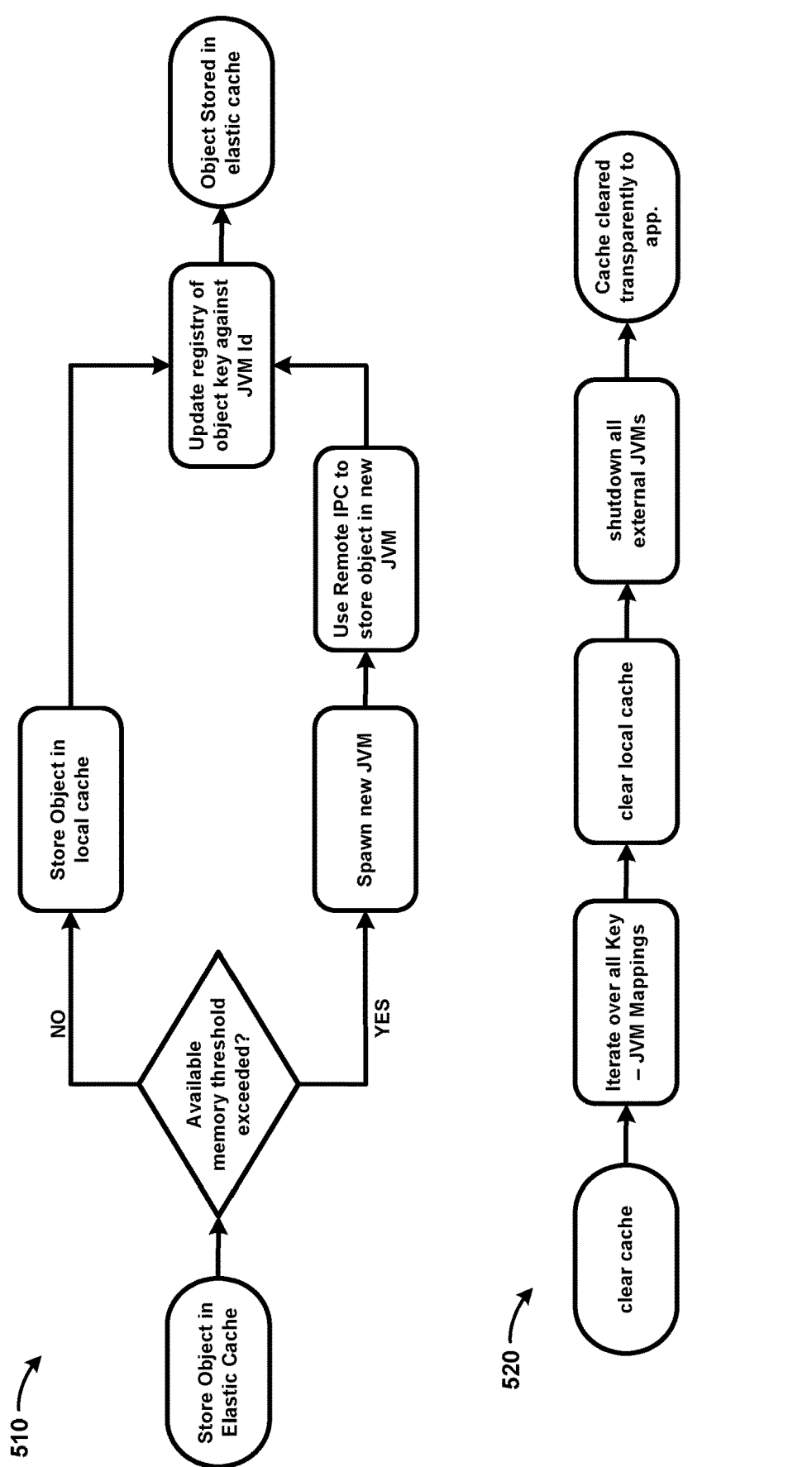
FIGS. 5A-5C illustrate the manner in which an elastic map structure is provided in containers initiated with contiguous memory of fixed size according to aspects of the present disclosure.
Figure 5B:
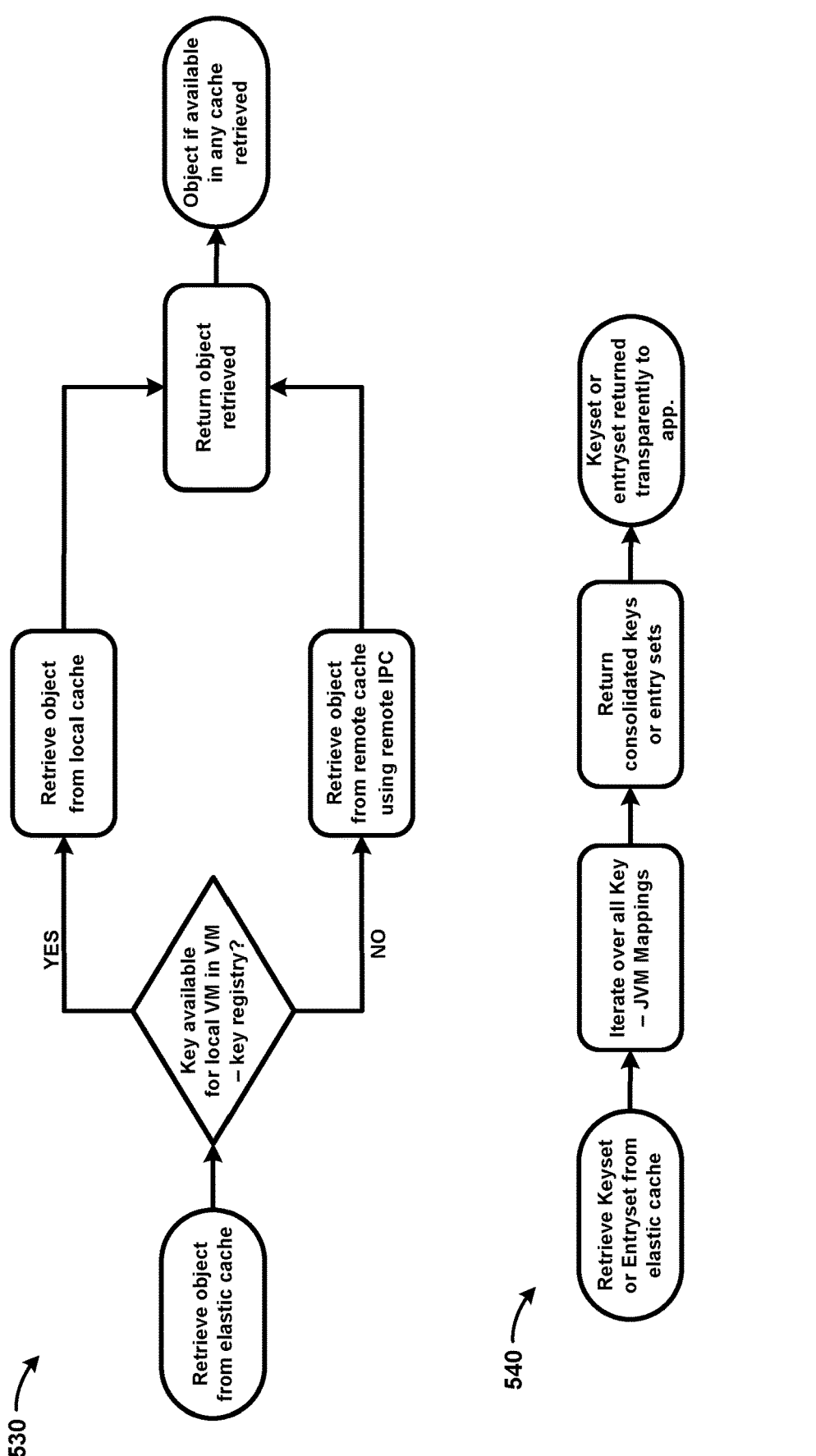
Figure 5C:
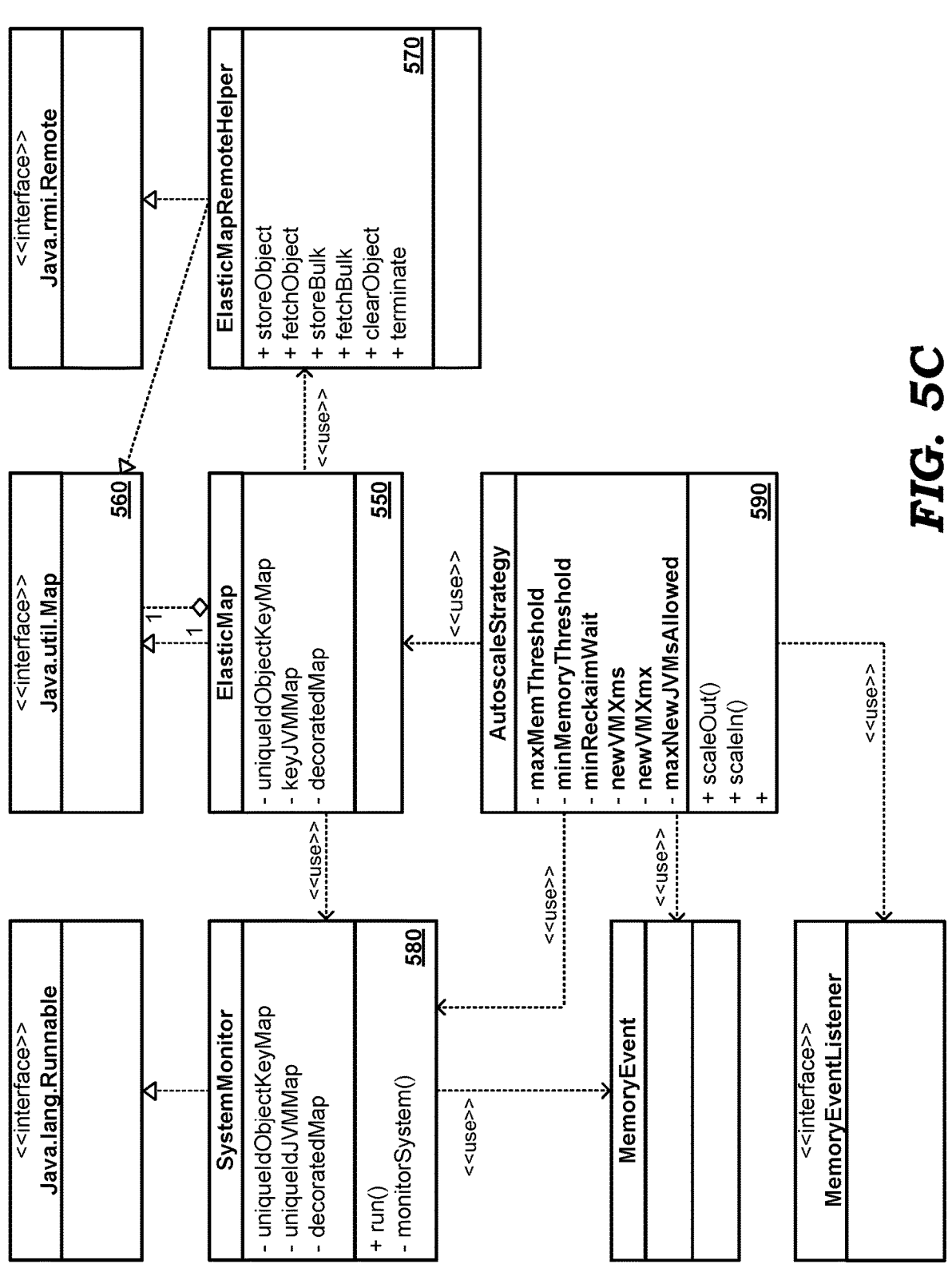

FIGS. 5A-5C illustrate the manner in which an elastic map structure is provided in containers initiated with contiguous memory of fixed size according to aspects of the present disclosure. Broadly, the aspects of the present disclosure introduce elastic features within the memory utilization of a JVM. The description below focuses on the HashMap object which is the de-factor data structure underlying numerous bespoke cache implementations used in the industry, but can be extended to other data structures as well, as will be apparent to one skilled in the arts by reading the disclosure herein. It may be appreciated that such an elastic map structure is intended to overcome memory utilization restrictions built into the Java programming language framework.

Referring to FIG. 5A, flow 510 illustrates the manner in which an object is stored in the elastic map structure. Upon receiving from an application, a request to store an object in the heap using the elastic map (data) structure, a monitoring thread checks if the available memory in the heap exceeds that of a pre-configured threshold, this is based on property maxMemThreshold of the HashMap implementation. If the maximum memory threshold is exceeded ("Yes" branch), the process/parent instance spawns a new child JVM based on the available memory of pre-configured size-based property newVMMemAlloc, by default this can be set to 256 KB.

The above steps are repeated for the new JVM using remote protocol, in case the new JVM's memory threshold is occupied, another child JVM can be spawned and registered in the parent JVM's object registry (440). A registry entry is made with the object key against the new JVM identifier. An IPC protocol (typically RMI) can thereafter be used to store the object in the child JVM. If the max memory threshold is not exceeded ("No" branch), the local memory is used to store the object.

Flow 520 illustrates the manner in which all the data in elastic map structure is cleared/removed. Upon receiving from an application, a request to clear the elastic map structure, the process iterates over each of the key—JVM registry to clear the local objects of the map stored in the corresponding JVMs. The process also shuts down the remote JVMs spawned and clears the key—JVM registry.

Referring to FIG. 5B, flow 530 illustrates the manner in which an object (already stored) in elastic map structure is retrieved. Upon receiving from an application, a request to retrieve an object in the heap using the elastic map structure, the process checks if the object is available in local cache, if so, returns the object else looks up the key—JVM registry and uses remote protocol to retrieve the object using IPC (RMI) from the child VM.

Flow 540 illustrates the manner in which all the keys (referred to as a Keyset) or all the objects (referred to as a Entryset) in an elastic map structure is retrieved. Again, the process iterates over each of the key—JVM registry to retrieve the keys and/or object stored in the corresponding child JVMs. The process returns the consolidated set of keys and values/objects as the respective Keyset and Entryset.

FIG. 5C is a UML (Unified Modeling Language) diagram illustrating the implementation of an elastic map structure (ElasticMap) in one embodiment. ElasticMap (550) is implemented as a decorator pattern over the Map interface provided as part of the Java programming framework. ElasticMap implements and encapsulates the Map interface (560) and may be used to encapsulate any object that implements the Map interface. The methods inherited from the Map interface are used to determine the functional target i.e. whether the function needs to be performed on a local Map or on the remote Map.

It must be noted that Object Key needs to be made unique to be able to function across JVMs. UUID or similar globally unique Id may be used to supplement the Key. A table may be maintained tracking the Unique Id against the actual key. Based on the decision of the AutoscaleStrategy object discussed below, the map will either be used in the local scope or will be used against the external JVMs. It is further recommended that the Unique Id be used as the key to store objects in the external JVM(s).

Such an object has the responsibility of consolidating data across all external JVMs transparently to the consuming application logic. For instance, a clear instruction would not only require cleaning of the local data but data across the external JVMs as noted above. Similarly, a look up keyvalue pairs would be implemented to look up keys from the local and values from all other remote JVMs.

A remote client and service (570) is required to communicate with the external JVMs to create a new data structure (Map here of the same type as the encapsulated data structure in the local JVM), perform delegate functions on the external data structure. The implementation may be optimized to minimize cross JVM communication. Although proposed RMI, custom socket implementation, shared memory (for single hardware machine) may be used in alternative embodiments.

System monitoring daemon (580) is responsible for relaying the available JVM and system memories at optimized periodicing intervals to AutoScaleStrategy object (590), which in turn takes autonomous decision on when to delegate objects to an external JVM vis-a-view the local JVM. Object 590 has the additional responsibility to initiate reclamation of external JVMs typically on a Last-In-First-Out basis. Object 590 needs to be pre-configured with default of overridden values of thresholds as noted above to be able to apply a strategy for lookup, storage, and other functionality on the elastic (data) map structure.

As such, aspects of the present disclosure provide a novel way to auto scale Java data structures such as Maps, to scale out transparently to the end user, and in essence prevent unforeseen out-of-memory errors.

It should be further appreciated that the features described above can be implemented in various embodiments as a desired combination of one or more of hardware, software, and firmware. The description is continued with respect to an embodiment in which various features are operative when the software instructions described above are executed.

7. Digital Processing System

Figure 6:
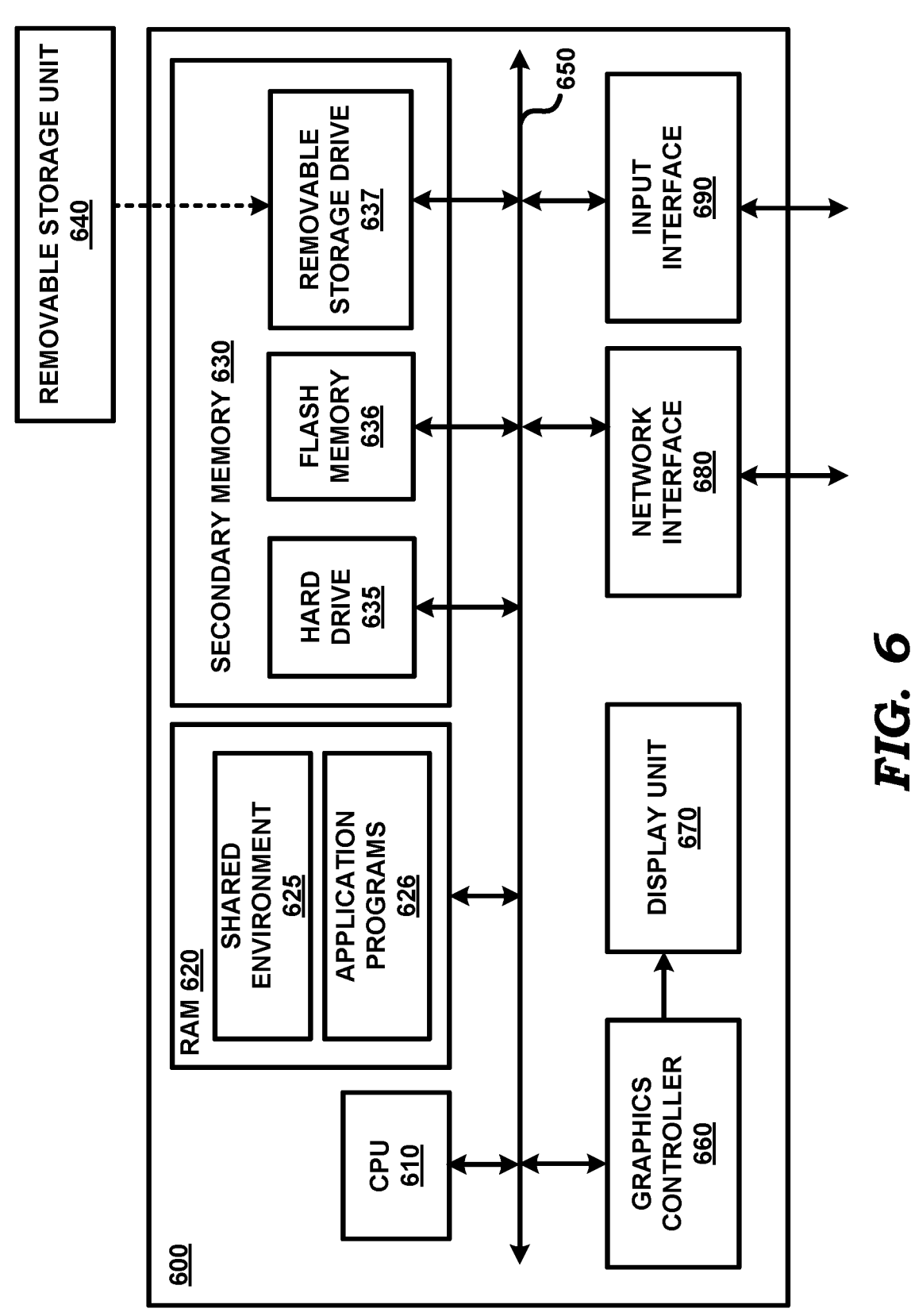
FIG. 6 is a block diagram illustrating the details of a digital processing system in which various aspects of the present disclosure are operative by execution of appropriate executable modules.

FIG. 6 is a block diagram illustrating the details of digital processing system (600) in which various aspects of the present disclosure are operative by execution of appropriate executable modules. Digital processing system 600 may correspond to server system 160 or any system implementing memory management tool 150.

Digital processing system 600 may contain one or more processors such as a central processing unit (CPU) 610, random access memory (RAM) 620, secondary memory 630, graphics controller 660, display unit 670, network interface 680, and input interface 690. All the components except display unit 670 may communicate with each other over communication path 650, which may contain several buses as is well known in the relevant arts. The components of FIG. 6 are described below in further detail.

CPU 610 may execute instructions stored in RAM 620 to provide several features of the present disclosure. CPU 610 may contain multiple processing units, with each processing unit potentially being designed for a specific task. Alternatively, CPU 610 may contain only a single general-purpose processing unit.

RAM 620 may receive instructions from secondary memory 630 using communication path 650. RAM 620 is shown currently containing software instructions constituting shared environment 625 and/or other user programs 626 (such as other applications, DBMS, etc.). In addition to shared environment 625, RAM 620 may contain other software programs such as device drivers, virtual machines, etc., which provide a (common) run time environment for execution of other/user programs.

Graphics controller 660 generates display signals (e.g., in RGB format) to display unit 670 based on data/instructions received from CPU 610. Display unit 670 contains a display screen to display the images defined by the display signals. Input interface 690 may correspond to a keyboard and a pointing device (e.g., touch-pad, mouse) and may be used to provide inputs. Network interface 680 provides connectivity to a network (e.g., using Internet Protocol), and may be used to communicate with other systems connected to the networks.

Secondary memory 630 may contain hard drive 635, flash memory 636, and removable storage drive 637. Secondary memory 630 may store the data and software instructions (e.g., for performing the actions of FIGS. 2 and 5A-5B, for implementing the blocks of FIGS. 4 and 5C), which enable digital processing system 600 to provide several features in accordance with the present disclosure. The code/instructions stored in secondary memory 630 may either be copied to RAM 620 prior to execution by CPU 610 for higher execution speeds, or may be directly executed by CPU 610.

Some or all of the data and instructions may be provided on removable storage unit 640, and the data and instructions may be read and provided by removable storage drive 637 to CPU 610. Removable storage unit 640 may be implemented using medium and storage format compatible with removable storage drive 637 such that removable storage drive 637 can read the data and instructions. Thus, removable storage unit 640 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 640 or hard disk installed in hard drive 635. These computer program products are means for providing software to digital processing system 600. CPU 610 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 630. Volatile media includes dynamic memory, such as RAM 620. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 650. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

8. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method for memory management in a digital processing system, said method comprising:

initiating a first instance of a container with a first contiguous memory of a first fixed size;

executing a set of applications within said first instance of said container;

receiving from an application of said set of applications, a request for an additional amount of memory;

determining whether said additional amount of memory can be allocated to said application within said first contiguous memory of said first fixed size;

if said additional amount of memory can be allocated, allocating a first memory space of said additional amount to said application within said first contiguous memory of said first fixed size; and if said additional amount of memory cannot be allocated:

initiating a second instance of said container with a second contiguous memory of a second fixed size; and allocating a second memory space of said additional amount to said application within said second contiguous memory, wherein after said allocating of said second memory space, said first contiguous memory in said first instance and said second contiguous memory in said second instance together support execution of said application within said first instance of said container.

2. The method of claim 1, wherein said container is a Java Virtual Machine (JVM) executing on a host having a host memory space containing both of said first contiguous memory and said second contiguous memory as corresponding portions, wherein said first instance is a first JVM and said second instance is a second JVM, wherein said application is executed in said first JVM based on an initial memory space contained in said first contiguous memory prior to said receiving of said request, and wherein said application is continued to be executed only in said first JVM, but based on both of said initial memory space and said second memory space, after completion of said allocating said second memory space.

3. The method of claim 1, wherein said first instance of said container contains a memory manager for allocating memory spaces within said first contiguous memory for storing objects of said set of applications, wherein a first set of objects of said application is stored in said first memory space, and a second set of objects of said application is stored in said second memory space, wherein said memory manager is designed to provide a common interface to said application for accessing both of said first set of objects and said second set of objects.

4. The method of claim 3, further comprising:

identifying that all objects of said set of applications require memory space less than a minimum threshold;

in response to said identifying:

migrating said second set of objects stored in said second contiguous memory to said first contiguous memory; and deleting said second instance of said container to free said second contiguous memory of said second fixed size.

5. The method of claim 1, wherein said application is designed to receive and process user requests received from user systems, wherein said application sends said request for said additional amount of memory to store data received as part of said user requests, wherein said data being more than said first fixed size represents a runtime memory spike, wherein said initiating and said allocating said second memory space ensures that said first instance of said container is enabled to handle said request, whereby said digital processing system is facilitated to manage said runtime memory spike in said first instance of said container initiated with contiguous memory of said first fixed size.

6. The method of claim 5, wherein said data is stored in a map structure as a set of keys and corresponding objects associated with each key, said set of keys containing a first subset of keys and a second subset of keys, wherein a first set of objects associated with said first set of keys are stored in said first instance of said container, wherein a second set of objects associated with said second set of keys are stored in said second instance of said container.

7. The method of claim 6, wherein said map structure is an ElasticMap object implemented as an extension of a HashMap object.

8. A non-transitory machine-readable medium storing one or more sequences of instructions for memory management in a digital processing system, said one or more sequence of instructions comprising:

a first sequence of instructions forming an operating system which upon execution by one or more processors contained in said digital processing system performs the actions of:

initiating a first instance of a container with a first contiguous memory of a first fixed size; and executing a set of applications within said first instance of said container;

a second sequence of instructions forming a memory manager within said first instance of said container which upon execution by said one or more processors contained in said digital processing system performs the actions of:

receiving from an application of said set of applications, a request for an additional amount of memory;

determining whether said additional amount of memory can be allocated to said application within said first contiguous memory of said first fixed size; and if said additional amount of memory can be allocated, allocating a first memory space of said additional amount to said application within said first contiguous memory of said first fixed size; and a third sequence of instructions forming a memory management tool which upon execution by said one or more processors contained in said digital processing system performs the actions of:

if said additional amount of memory cannot be allocated:

initiating a second instance of said container with a second contiguous memory of a second fixed size; and allocating a second memory space of said additional amount to said application within said second contiguous memory, wherein after said allocating of said second memory space, said first contiguous memory in said first instance and said second contiguous memory in said second instance together support execution of said application within said first instance of said container.

9. The non-transitory machine-readable medium of claim 8, wherein said container is a Java Virtual Machine (JVM) executing on a host having a host memory space containing both of said first contiguous memory and said second contiguous memory as corresponding portions, wherein said first instance is a first JVM and said second instance is a second JVM, wherein said application is executed in said first JVM based on an initial memory space contained in said first contiguous memory prior to said receiving of said request, and wherein said application is continued to be executed only in said first JVM, but based on both of said initial memory space and said second memory space, after completion of said allocating said second memory space.

10. The non-transitory machine-readable medium of claim 8, wherein said memory manager performs the actions of allocating memory spaces within said first contiguous memory for storing objects of said set of applications, wherein a first set of objects of said application is stored in said first memory space, and a second set of objects of said application is stored in said second memory space, wherein said memory manager is designed to provide a common interface to said application for accessing both of said first set of objects and said second set of objects.

11. The non-transitory machine-readable medium of claim 10, wherein said memory management tool further performs the actions of:

identifying that all objects of said set of applications require memory space less than a minimum threshold;

in response to said identifying:

migrating said second set of objects stored in said second contiguous memory to said first contiguous memory; and deleting said second instance of said container to free said second contiguous memory of said second fixed size.

12. The non-transitory machine-readable medium of claim 8, wherein said application is designed to receive and process user requests received from user systems, wherein said application sends said request for said additional amount of memory to store data received as part of said user requests, wherein said data being more than said first fixed size represents a runtime memory spike, wherein said initiating and said allocating said second memory space ensures that said first instance of said container is enabled to handle said request, whereby said digital processing system is facilitated to manage said runtime memory spike in said first instance of said container initiated with contiguous memory of said first fixed size.

13. The non-transitory machine-readable medium of claim 12, wherein said data is stored in a map structure as a set of keys and corresponding objects associated with each key, said set of keys containing a first subset of keys and a second subset of keys, wherein a first set of objects associated with said first set of keys are stored in said first instance of said container, wherein a second set of objects associated with said second set of keys are stored in said second instance of said container.

14. The non-transitory machine-readable medium of claim 13, wherein said map structure is an ElasticMap object implemented as an extension of a HashMap object.

15. A digital processing system comprising:

a random access memory (RAM) to store instructions for memory management in said digital processing system; and one or more processors to retrieve and execute the instructions, wherein execution of the instructions causes the digital processing system to perform the actions of:

initiating a first instance of a container with a first contiguous memory of a first fixed size;

executing a set of applications within said first instance of said container;

receiving from an application of said set of applications, a request for an additional amount of memory;

determining whether said additional amount of memory can be allocated to said application within said first contiguous memory of said first fixed size;

if said additional amount of memory can be allocated, allocating a first memory space of said additional amount to said application within said first contiguous memory of said first fixed size; and if said additional amount of memory cannot be allocated:

initiating a second instance of said container with a second contiguous memory of a second fixed size; and allocating a second memory space of said additional amount to said application within said second contiguous memory, wherein after said allocating of said second memory space, said first contiguous memory in said first instance and said second contiguous memory in said second instance together support execution of said application within said first instance of said container.

16. The digital processing system of claim 15, wherein said container is a Java Virtual Machine (JVM) executing on a host having a host memory space containing both of said first contiguous memory and said second contiguous memory as corresponding portions, wherein said first instance is a first JVM and said second instance is a second JVM, wherein said application is executed in said first JVM based on an initial memory space contained in said first contiguous memory prior to said receiving of said request, and wherein said application is continued to be executed only in said first JVM, but based on both of said initial memory space and said second memory space, after completion of said allocating said second memory space.

17. The digital processing system of claim 15, wherein said first instance of said container contains a memory manager for allocating memory spaces within said first contiguous memory for storing objects of said set of applications, wherein a first set of objects of said application is stored in said first memory space, and a second set of objects of said application is stored in said second memory space, wherein said memory manager is designed to provide a common interface to said application for accessing both of said first set of objects and said second set of objects.

18. The digital processing system of claim 17, further performing the actions of:

identifying that all objects of said set of applications require memory space less than a minimum threshold;

in response to said identifying:

migrating said second set of objects stored in said second contiguous memory to said first contiguous memory; and deleting said second instance of said container to free said second contiguous memory of said second fixed size.

19. The digital processing system of claim 15, wherein said application is designed to receive and process user requests received from user systems, wherein said application sends said request for said additional amount of memory to store data received as part of said user requests, wherein said data being more than said first fixed size represents a runtime memory spike, wherein said initiating and said allocating said second memory space ensures that said first instance of said container is enabled to handle said request, whereby said digital processing system is facilitated to manage said runtime memory spike in said first instance of said container initiated with contiguous memory of said first fixed size.

20. The digital processing system of claim 19, wherein said data is stored in a map structure as a set of keys and corresponding objects associated with each key, said set of keys containing a first subset of keys and a second subset of keys, wherein a first set of objects associated with said first set of keys are stored in said first instance of said container, wherein a second set of objects associated with said second set of keys are stored in said second instance of said container.

\* \* \* \* \*